(12) United States Patent
Sugar et al.

(10) Patent No.: US 7,527,253 B2
(45) Date of Patent: May 5, 2009

(54) ADJUSTABLE STIFFNESS LEAF SPRING ACTUATORS

(75) Inventors: Thomas Sugar, Tempe, AZ (US); Kevin Hollander, Phoenix, AZ (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 11/423,327

(22) Filed: Jun. 9, 2006

(65) Prior Publication Data
US 2007/0040312 A1  Feb. 22, 2007

Related U.S. Application Data

(60) Provisional application No. 60/688,723, filed on Jun. 9, 2005.

(51) Int. Cl.
*B60G 11/34* (2006.01)
*A61F 2/64* (2006.01)

(52) U.S. Cl. .................... 267/231; 188/26; 188/28; 188/232; 188/234; 623/24

(58) Field of Classification Search ......... 267/158–160, 267/182, 26, 28, 231, 232, 234; 623/24–56; 180/8.1
See application file for complete search history.

(56) References Cited

U.S. PATENT DOCUMENTS 2,619,652 A * 12/1952 Vesper .................. 623/26

| 7,169,190 B2 * | 1/2007 | Phillips et al. ............... 623/38 |
| 2004/0064195 A1 * | 4/2004 | Herr ........................... 623/24 |
| 2006/0249315 A1 * | 11/2006 | Herr et al. .................... 180/8.1 |

OTHER PUBLICATIONS

Anirban, D., et al., "A Two DOF Manipulator with Adjustable Compliance Capabilities and Comparison with the Human Finger," Care Policy and Research, AHCPR publication No. 95-0662, 1995.
Morita, T., et al., "Design and Development of a New Robot Joint Using a Mechanical Impedance Adjuster," *ICRA* 1995: 2469-2475.
Seki, H., et al., 2000, "Development of a Robot Joint Mechanism with Variable Compliance by Rotating a Leaf Spring," Japan/USA Flexible Automation Conference, Ann Arbor, July.
Faraz, A., et al., "Design of Haptic Interface Through Stiffness Modulation for Endosurgery: Theory and Experiments," *ICRA* 1998: 1007-1012.
Toshio Morita, Shigeki Sugano: Design and Development of a New Robot Joint Using a Mechanical Impedance Adjuster. *ICRA* 1995: 2469-2475.

(Continued)

*Primary Examiner*—Christopher P Schwartz
(74) *Attorney, Agent, or Firm*—Connolly Bove Lodge & Hutz LLP

(57) ABSTRACT

The present invention is a spring based actuator with a leaf spring having a length, width and thickness and a coil spring positioned over the leaf spring. The coil spring further comprises: a first end; a second end; and at least one force generator acting on either the first end of the coil spring and the second end of the coil spring to deflect the coil spring and the leaf spring.

7 Claims, 5 Drawing Sheets

$$I_{rigid} = \frac{thickness \cdot width^3}{12}$$

(B)

OTHER PUBLICATIONS

Ali Faraz, Shahram Payandeh, Andon Salvarinov: Design of Haptic Interface Through Stiffness Modulation for Endosurgery: Theory and Experiments. *ICRA* 1998: 1007-1012.

Anirban De and Uri Tasch, A Two-DOF Manipulator with Adjustable Compliance Capabilities and Comparison with the Human Finger, Care Policy and Research, AHCPR publication No. 95-0662, 1995.

* cited by examiner

ADJUSTABLE STIFFNESS LEAF SPRING ACTUATORS

CROSS-REFERENCE TO RELATED APPLICATIONS

This Application is a Non-Provisional application claiming priority to Provisional application 60/688,723 filed on Jun. 9, 2005.

BACKGROUND OF THE INVENTION

In the past two decades increased interest has been devoted to developing 'compliant' robotic systems. Compliance in robotics implies 'give' or 'softness' in what is typically a rigid, linked system. In early applications to industrial robots, compliant systems have allowed robots to perform force sensitive tasks (e.g. surface grinding) while remaining stable during their operation. More recently, interest in developing 'wearable' robots or exoskeleton systems have been demonstrated. The typical role of 'wearable' robotic system is to enhance a person's strength. Compliance in this type of application is imperative to ensure safety for the operator, as the robotic system is not tucked safely away behind a cage, as in a factor floor robot.

The process of interfacing robotics directly onto humans introduces design issues of weight, power consumption and again safety. To meet the challenges laid by these constraints, actuators based upon spring concepts offer a promising solution. Unlike traditional motor approaches, spring based actuators are inherently compliant, energy conservative and lightweight. Through manipulation of an actuator's 'effective' structure, variations in actuator stiffness can be obtained. A 'Force Suit' constructed from these actuators can be created, thus enabling the disabled or weak to regain lost functionality and independence in their everyday lives.

BRIEF SUMMARY OF THE INVENTION

One embodiment of the invention is a spring based actuator comprising: a leaf spring having a length, a width and a thickness; and a force generator further comprising: a solid end in contact with the leaf spring at a first point along the length of the leaf spring; and a movable arm for moving the solid end to a second point along the length of the leaf spring. Preferably in this embodiment, the thickness of the leaf spring varies in value along the length of the leaf spring.

Yet another embodiment of the invention is a spring based actuator comprising: a leaf spring having a length, width and thickness; and a coil spring positioned over the leaf spring, the coil spring further comprising: a first end; a second end; and at least one force generator acting on either the first end of the coil spring and the second end of the coil spring to deflect the coil spring and the leaf spring.

DETAILED DESCRIPTION OF THE EMBODIMENTS OF THE INVENTION

Figure 1:
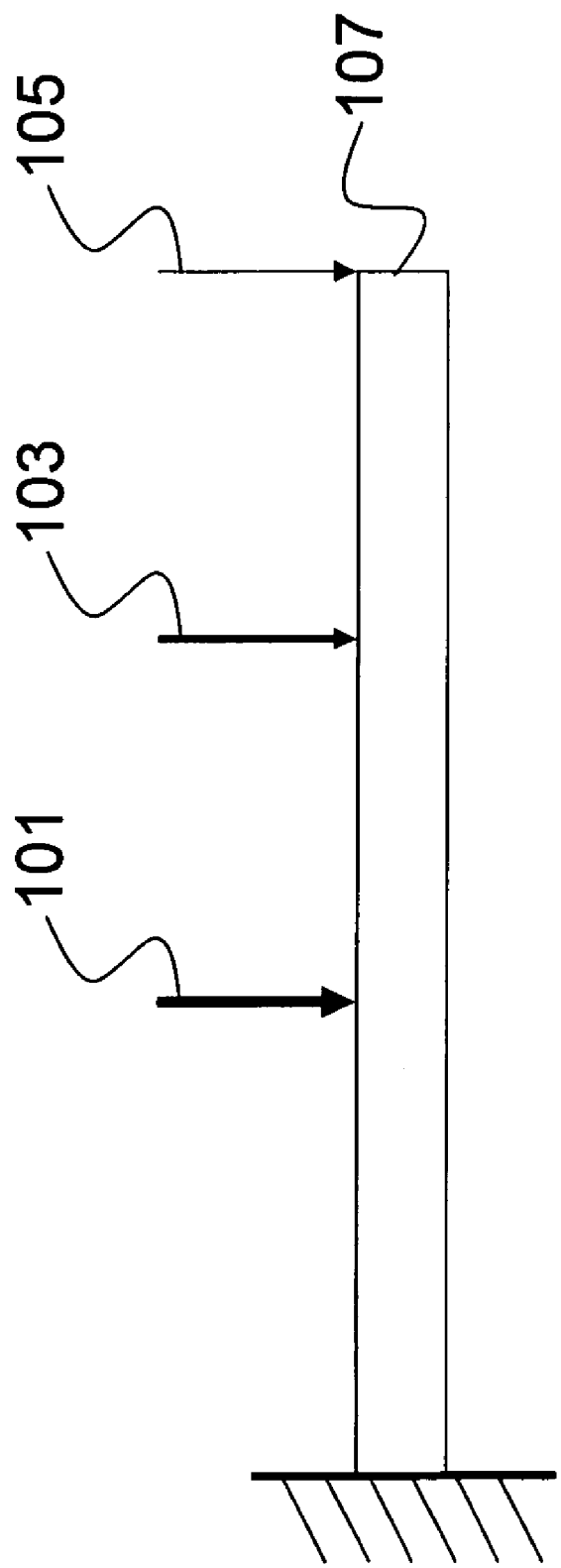
FIG. 1 illustrates the basic concept of a Length Adjusted Actuator (LAA).

A. Concept of Leaf Spring Actuation (LSA)

The detailed description set forth below in connection with the drawings is intended as a description of the presently preferred embodiments of adjustable stiffness leaf spring actuators provided in accordance with practice of the present invention and is not intended to represent the only forms in which the present invention may be constructed or utilized. The description sets forth the features and the steps for constructing and using the adjustable stiffness leaf spring actuators of the present invention in connection with the illustrated embodiments. It is to be understood, however, that the same or equivalent functions and structures may be accomplished by different embodiments that are also intended to be encompassed within the spirit and scope of the invention.

One set of concepts for spring based actuation can be achieved through 'effective' structure manipulation of a leaf spring. Actuated motion derived from this method is typically in one direction and for leaf springs the motion is straightening. A bent beam or leaf spring is a form of stored energy. In contrast to just simple loading (energy storage) and unloading (energy return) of the leaf spring, an extra step of altering the leaf spring's 'effective' stiffness is introduced. Stiffness is the inverse quantity of compliance; a higher stiffness mechanism has a much lower value of compliance. The ability to adjust or control stiffness is the same ability to manipulate the values of compliance.

Bending a low stiffness leaf spring requires little force and for a wearable robotic system the initial bending of the spring could come from the wearer. However, once the leaf spring is deflected, energy is needed, the actuator structure is changed thereby increasing its 'effective' stiffness. The return energy of the device is then proportional to the new stiffness and the original deflection, thereby creating a much stronger force to effect straightening of the spring.

In the following text are descriptions for several leaf spring style actuators, each based upon a different manipulation of the same equation for classical beam bending theory. For any analysis, a leaf spring can be treated as simple beam. Therefore to understand the basic concepts of a LSA, let us look at the small deflection beam equation found in most undergraduate mechanics of material textbooks, seen in equation 1.

$$M = \left(\frac{E \cdot I}{L}\right) \cdot \theta \text{ (Moment/Slope Relation)} \tag{1}$$

Where M is the bending moment (or torque), E the material modulus, I the moment of inertia, L the effective beam length and θ is the angle of bending or slope. In this representation of bending, the term EI/L represents bending stiffness as is shown in equation 2.

$$K = \frac{E \cdot I}{L} \text{ (Bending Stiffness)} \quad (2)$$

Each of the spring style actuator concepts presented here are based upon manipulation of this basic equation. In the bending stiffness relationship (equation 2) there are three quantities with which one can consider, E, I, and L. If one were to design a controllable structure that manipulated any of these three parameters, then a controllable stiffness structure is created or in our case, a method of actuation.

In the above description equations, the major assumption of classical beam theory is 'small' displacements of the beam. The reason for this is a justification for neglecting the effect of shear stresses in beam bending. The analysis of beams without shear is a much easier process and is simplified to basic formulas. However, for many wearable robot applications the small displacement assumption may not be useful.

Fortunately, the area of beam mechanics is well described, even for large displacement bending. In the case of the large deflection bending of a leaf spring the above relationship in fact, over predicts a beam's deflection. Even so, the percent reduction in bending deflection is less than 8% (i.e. 8% maximum error) for rectangular cross-section beams as long as equation 3 is true (Wahl, 1963). For the design of a wearable robotic system this is an acceptable approximation.

$$\frac{M \cdot L}{E \cdot I} \leq 1.0 \quad (3)$$

B. Length Adjusted Actuator (LAA)

The first actuator concept to consider is the length adjusted actuator, or LAA. From equation 2 we can see that increases in L, will decrease the overall value of bending stiffness. Conversely, shortening L will lead to a much higher value of stiffness. To illustrate this basic concept please refer to FIG. 1.

Bending occurring from loading at the three different positions 101, 103, 105 along the beam 107 will result in very different beam stiffness. This is because the 'effective' length of the beam is considered to be at the point of loading. If an actuator were created that used a roller to glide and adjust the 'effective' length of the beam then this actuator would respond with different stiffness characteristics such as roller, low stiffness and high stiffness, as shown in the proof of concept implementations of FIG. 2A, FIG. 2B and FIG. 2C, respectively.

Figure 2:
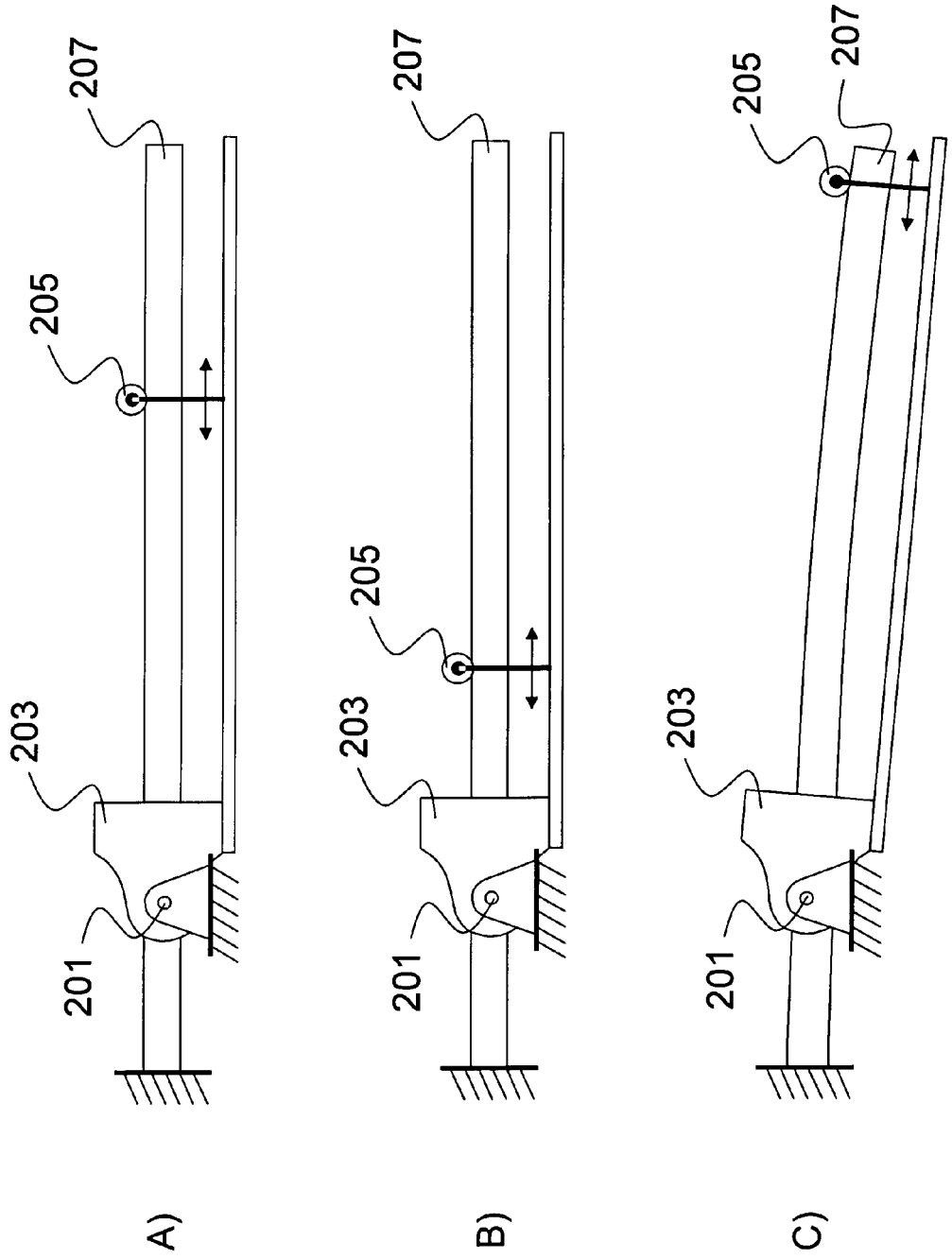
FIG. 2A is a photograph of an LAA roller proof-of-concept implementation.
FIG. 2B is a photograph of a LAA high stiffness proof-of-concept implementation.
FIG. 2c is a photograph of a LAA low stiffness proof-of-concept implementation.

The roller implementation, as shown in FIG. 2A, is driven by a small motor powered by a 9 Volt battery. The roller 205 travels up and down the leaf spring 207 creating a variation in bending stiffness in the overall structure. A shown in FIG. 2C, the weight of the apparatus causes the leaf spring 207 to sag when the roller 205 is in the long beam position. In contrast, as seen in the photo of FIG. 2B, the device is in a near horizontal position as the roller 205 is in the short beam position. As the roller 205 traverses the length of the beam, the apparatus proportionally begins to increase in stiffness causing the end position elevation.

C. Length (L) and Moment of Inertia (I) Adjusted Actuator (LIAA)

In exploring the LAA concept presented above, one limitation has become apparent. That limitation is for an actuator to affect a large range of stiffness values, a very long beam is required. For a wearable robotic system this may not be practical, as the lengths of these structures will be partially driven by the size of the individual who would wear them. To combat this limitation an approach involving a tapered beam or tapered leaf spring may be desired. The same equations as present above still apply but rather than the leaf spring remaining constant in cross-sectional shape, it could vary over the course of its length, as shown in FIG. 3.

Figure 3:
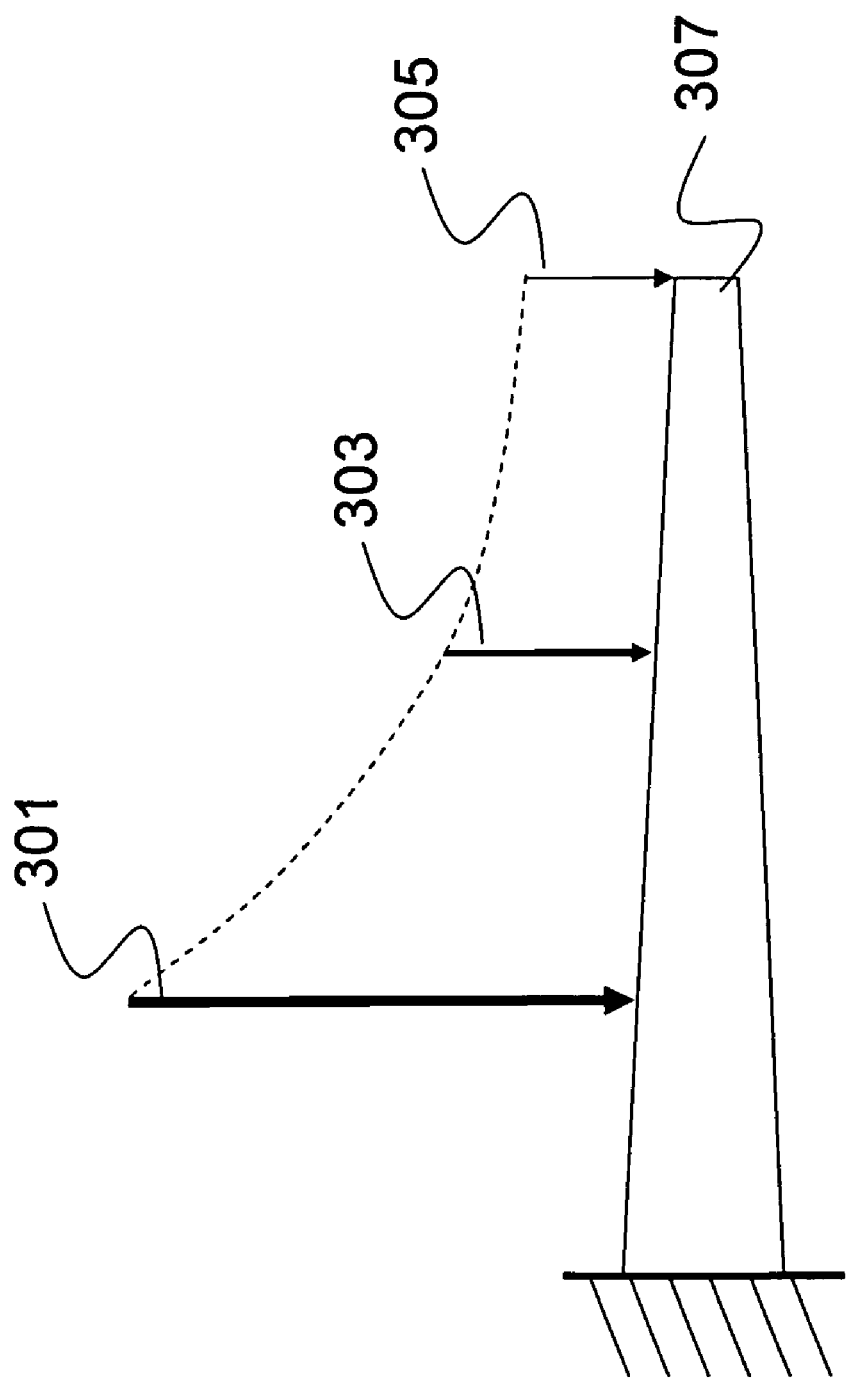
FIG. 3 shows an example of how the change in beam cross-section height could change across the length of the beam in a Length and Moment of Inertia Adjusted Actuator (LIAA).

As shown in FIG. 3, the change in beam 307 cross-section height could change across the length of the beam 307. The effect of this is to vary the quantity I, moment of inertia, as a function of L, beam length and the variation of I does not have to be linear. Also, these adjustments to the quantity, I do not need to adjustable. The varying nature of I with respect to L, creates a much greater range of available stiffness over a very much shorter range of lengths.

D. Moment of Inertia (I) Adjusted Actuator (IAA)

In another approach, having a large range of stiffness available in a short range of displacement can be achieved by simply rotating a normal leaf spring 90° with respect to it cross-sectional area. This rotation is in affect another method to alter the moment of inertia quantity, I. However, unlike the tapered beam approach, the adjustments to I are the controlled structural quantity. An illustration of this concept can be seen in FIG. 4.

Figure 4:
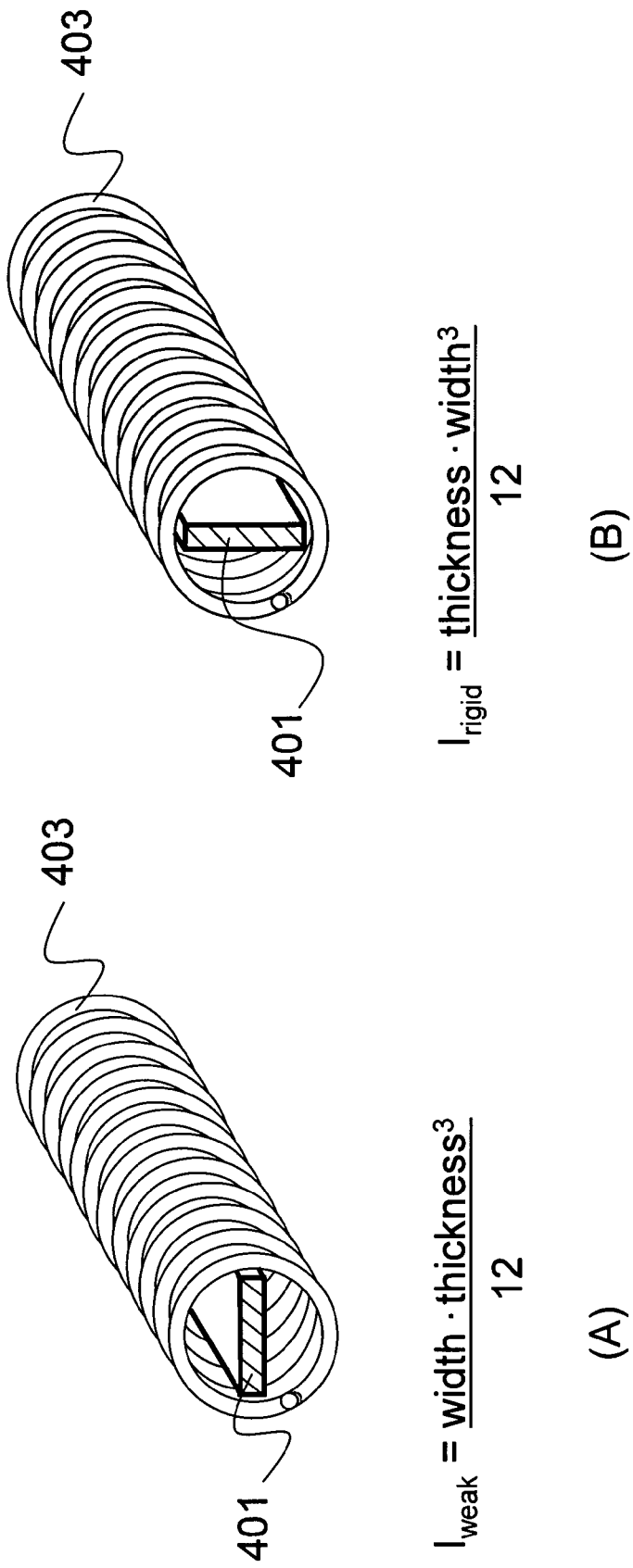
FIG. 4A shows an example of the axis of bending operating about the thinnest portion of a rectangular geometry in a very low stiffness structure.
FIG. 4B, shows the same geometry of FIG. 4 but rotated 90° to force bending to occur about the widest portion of the cross-section.

What the reader will notice in FIG. 4 is that a flat leaf spring 401 is shown inside a regular compression (or coil) spring 403. The purpose of this second spring 403 will be described shortly. The main feature of IAA concept is the equation I for a rectangular cross-section beam. In FIG. 4A, the axis of bending is operating about the thinnest portion of the rectangular geometry, creating effectively a very low stiffness structure. In FIG. 4B, the same geometry is rotated 90° to force bending to occur about the widest portion of the cross-section, this effectively creates an almost rigid structure. The IAA concept of the present invention offers the widest range of available stiffnesses in the most compact and scalable package.

Although FIG. 4B creates an almost rigid stiffness structure, it is not stable beyond a design calculated load and after that load lateral buckling of the beam will occur (Timoshenko and Gere, 1961). The criterion for lateral buckling load of a slender beam is dependent on two quantities which are shown in equation 4.

$$M_{limit} = \sqrt{\pi^2 \cdot K_{weak} \cdot K_{torsion}} \quad (4)$$

Where $M_{limit}$ is the limiting moment, $K_{weak}$, is the weak axis bending stiffness and $K_{torsion}$, is the beams stiffness in torsion. The geometry of a single material beam drives both of these equations simultaneously. A slender rectangular beam is likely to be weak in both weak axis bending (desired) and weak in torsion (not desired). As a result, lateral buckling is likely to occur. However, if we were to consider a composite beam structure, more like the one shown in FIG. 4, then the weak axis bending stiffness and torsional bending stiffness could be designed almost independently. The coil spring 403 shown in FIG. 4A and FIG. 4B, which surrounds the flat leaf spring 401 is included in the structure to improve the torsional stiffness characteristics without significantly affecting the range of stiffness desired by rotating the flat leaf spring, Combinations of these two parameters can lead to very scalable designs. An image of a prototype of the combined composite IAA beam can be seen in FIG. 5A and FIG. 5B.

Figure 5:
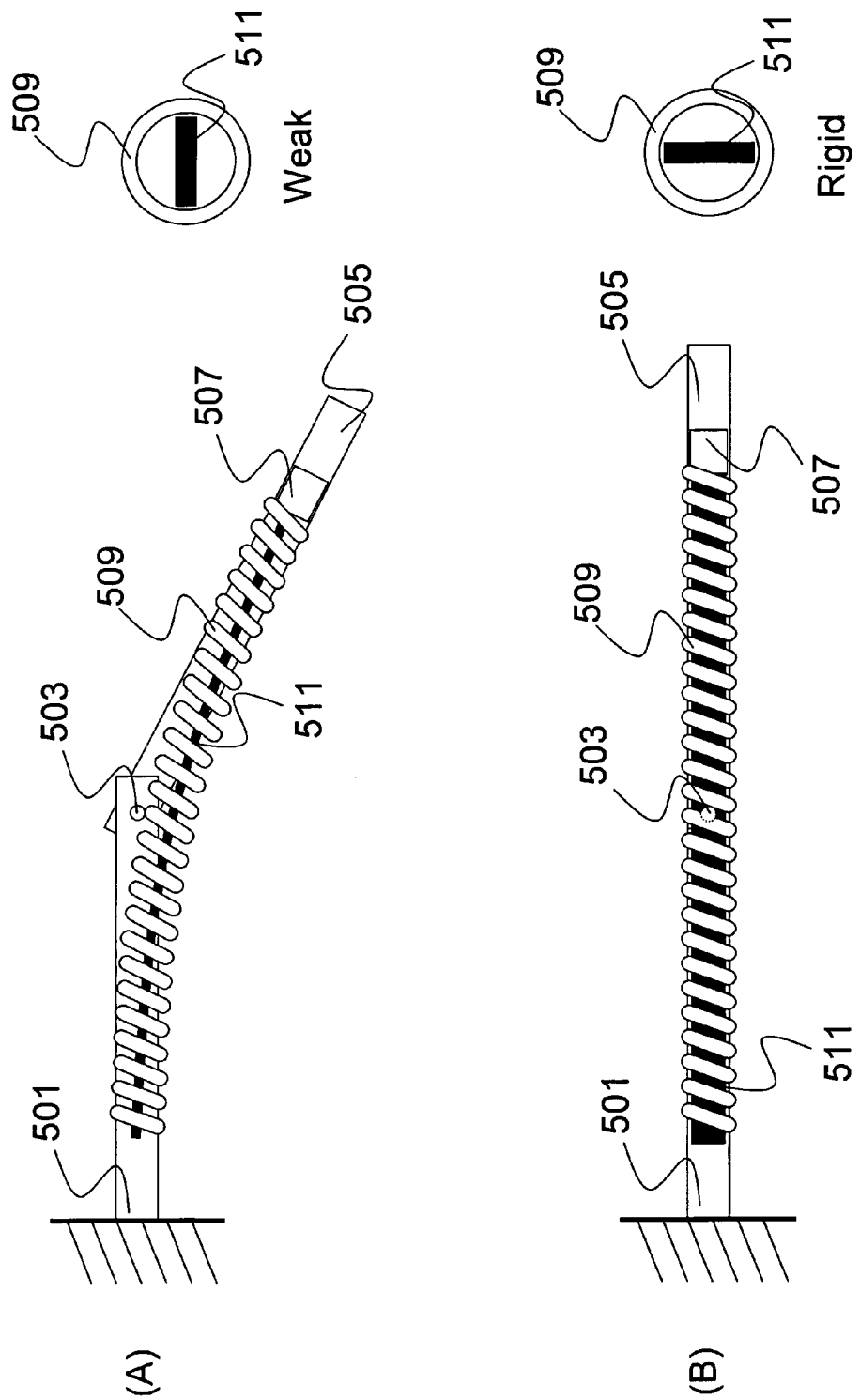
FIG. 5A shows a photo of an example of a beam in the rigid stiffness state.
FIG. 5B shows a photo of an example of a beam in the relaxed position state.

FIG. 5B shows the beam in the rigid stiffness state and FIG. 5A shows the beam in the relaxed position state. Internal to the coil spring shown in FIG. 5A and FIG. 5B is a flat leaf spring 511 and the whole composite is rotated to affect varying degrees of stiffness.

As an alternative view to this wearable robotic design problem, let us consider a situation where the issue of lateral buckling can be viewed as a safety mechanism. The joint of the actuator would perform like a rigid structure until the threshold load (buckling load) is reached. As the buckling occurs no harm would be had by either machine or the person to which it is connected.

D. Material Modulus (E) Adjusted Actuator (EAA)

Currently this idea has not been explored in detail. But following similar logic to the above reported ideas, we can describe the nature of an actuator that can adjust its effective material properties. In the simplest form, one could use a low stiffness material, maybe rubber, which has a series of holes or cylindrical cavities along it length. Bending of such a beam would be quite easy. Now imagine a series of small diameter high stiffness control for the bent beam. A more sophisticated case could include a composite beam structure in which stiffness is dependent upon applied voltage as in piezo-materials. Again the key to success would be the ability to load the device in a low stiffness arrangement and increase stiffness once deflected, thus generating a movement force to the straightening direction.

F. Discussion of Alternative Implementations

The science of beam mechanics has been around for more than 100 years and the study of large deflection beams since 1945. As such, it is not surprising that others have thought to use manipulations in beam mechanics to affect compliance changes in robotic joints. However, in all that we have found none have used these ideas as a means of actuation or movement, but merely to change the passive 'feel' of the joint. The most common example of these involved some sort of haptic interface or robot gripper. The competing ideas provide solutions to the long considered robot issue of picking up fragile objects. Adjustable compliance mechanisms to this job very well.

Using an approach similar to the LAA concept, Morita, (Morita and Sugano, 1995) and Faraz, (Faraz and Payandeh, 1998) employ length manipulations to a rectangular beam. Similar to the LIAA approach, Anirban (Anirban and Tasch, 1995) have also manipulated beam length, but on a triangular shaped leaf spring. Different from the above proposed LIAA, Anirban used a beam that is variable in width. A variable width beam yields a linear increase in I, verses a cubic increase in I seen with variations in height. Also, Seki, (Seki et al., 2000) has employed a concept similar to the IAA (rotated leaf spring) approach, although they did not seem to recognize or account for the limitations of lateral buckling as is described above. In all, these ideas seem to be limited to the concept of passive joint properties rather than methods of active joint manipulation.

It should be understood that the foregoing embodiments are exemplary only, and that the present invention includes various other configurations. Accordingly, many alterations and modifications may be made by those having ordinary skill in the art without departing from the spirit and scope of the invention. Therefore, it must be understood that the disclosed embodiments have been set forth only for the purposes of illustrations and that they should not be understood to be limiting the invention to what are defined by the foregoing examples.

What is claimed is:

1. A variable stiffness actuator comprising:
a leaf spring having a length, a longitudinal axis, a width, and a thickness, the leaf spring adapted to rotate about the longitudinal axis and sustain loads along the longitudinal axis;
a first end; and
a second end and wherein when the leaf spring is rotated about the longitudinal axis from at least one of the first and second ends, the bending stiffness of the actuator is changed; and
a coil spring mounted concentrically around the leaf spring, the coil spring having a first coil spring end and a second coil spring end and wherein when a load is applied to at least one of the first and second coil spring ends the coil spring and the leaf spring can cooperatively deflect in a vertical plane relative to the longitudinal axis and wherein the coil spring inhibits movement of the leaf spring in a horizontal direction relative to the longitudinal axis when the load is applied to the at least one of the first and second coil spring ends.

2. The variable stiffness actuator of claim 1 wherein:
the moment of inertia of the leaf spring is changed when the leaf spring is rotated about the longitudinal axis.

3. A variable stiffness actuator comprising:
a leaf spring having a length, width, and thickness; and
a first end;
a second end; and
at least one means for rotating either the first end of the leaf spring or the second end of the leaf spring or both ends to rotate the leaf spring to adjust a bending stiffness of the actuator,
wherein the leaf spring is mounted concentric within a coil spring, the coil spring comprising:
a first end; and
a second end;
wherein the coil spring inhibits lateral buckling of the variable stiffness actuator.

4. The variable stiffness actuator of claim 3, wherein a moment of inertia of the leaf spring is adjusted by rotating the leaf spring with respect to a cross sectional area and a bending stiffness of the variable stiffness actuator can be varied between a low value and a high value.

5. A spring based actuator comprising:
a leaf spring having a length, a longitudinal axis, a cross-sectional area, a width and a thickness; and
a coil spring positioned over the leaf spring to permit cooperative deflection of the leaf spring and the coil spring and whereby at least the leaf spring is rotatable about the longitudinal axis, the coil spring further comprising:
a first end; and
a second wherein when a force is applied to either the first end of the coil spring and the second end of the coil spring the coil spring and the leaf spring cooperatively deflect and wherein a range of thickness of the actuator is adjusted by rotating the leaf spring 90 degrees with respect to the cross-sectional area.

6. A spring based actuator comprising:
a leaf spring having a length, a longitudinal axis, a cross-sectional area, a width and a thickness; and a coil spring positioned over the leaf spring to permit cooperative deflection of the leaf spring and the coil spring and whereby at least the leaf spring is rotatable about the longitudinal axis, the coil spring further comprising:

a first end; and a second end wherein when a force is applied to either the first end of the coil spring and the second end of the coil spring the coil spring and the leaf spring cooperatively deflect and wherein a range of thickness of the actuator is adjusted by rotating the leaf spring with respect to the cross-sectional area.

7. A variable stiffness actuator comprising:

a leaf spring having a length, a longitudinal axis, a width, and a thickness, the leaf spring adapted to rotate about the longitudinal axis and sustain loads along the longitudinal axis;

a first end; and a second end and wherein when the leaf spring is rotated about the longitudinal axis from at least one of the first and second ends, the bending stiffness of the actuator is changed; and wherein the leaf spring is cooperatively mounted in parallel with at least one coil spring, the at least one coil spring having a first coil spring end and a second coil spring end and wherein when a load is applied to at least one of the first and second coil spring ends the coil spring and the leaf spring can cooperatively deflect in a vertical plane relative to the longitudinal axis and wherein the coil spring inhibits movement of the leaf spring in a horizontal direction relative to the longitudinal axis when the load is applied to the at least one of the first and second coil spring ends.

* * * * *